(12) United States Patent
Lin et al.

(10) Patent No.: US 10,931,409 B2
(45) Date of Patent: Feb. 23, 2021

(54) CONFIGURABLE TIMING RELATIONSHIP AND HARQ OPERATIONAL PARAMETERS

(71) Applicant: Telefonaktiebolaget LM Ericsson (publ), Stockholm (SE)

(72) Inventors: Xingqin Lin, Santa Clara, CA (US); Ansuman Adhikary, Telangana (IN); Ali S. Khayrallah, Mountain View, CA (US); Mikael Prytz, Rönninge (SE); Magnus Stattin, Upplands Väsby (SE); Yi-Pin Eric Wang, Fremont, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/336,757

(22) PCT Filed: Sep. 26, 2017

(86) PCT No.: PCT/IB2017/055857
§ 371 (c)(1),
(2) Date: Mar. 26, 2019

(87) PCT Pub. No.: WO2018/055600
PCT Pub. Date: Mar. 29, 2018

(65) Prior Publication Data
US 2020/0076544 A1 Mar. 5, 2020

Related U.S. Application Data

(60) Provisional application No. 62/399,925, filed on Sep. 26, 2016.

(51) Int. Cl.
*H04L 1/18* (2006.01)
*H04B 17/364* (2015.01)
(Continued)

(52) U.S. Cl.
CPC ........... *H04L 1/1825* (2013.01); *H04B 7/195* (2013.01); *H04B 17/364* (2015.01);
(Continued)

(58) Field of Classification Search
CPC ....... H04L 1/1812–1825; H04L 1/1864; H04L 1/1896
See application file for complete search history.

(56) References Cited

U.S. PATENT DOCUMENTS

| 2010/0325503 A1 | 12/2010 | Womack et al. |
| 2013/0107735 A1* | 5/2013 | Hoymann .............. H04L 1/1822 370/252 |

(Continued)

OTHER PUBLICATIONS

Ericsson, "R1-073731: On the number of hybrid ARQ processes in LTE," Third Generation Partnership Project (3GPP), TSG-RAN WG1 #50, Aug. 20-24, 2007, 4 pages, Athens.
(Continued)

*Primary Examiner* — Pao Sinkantarakorn
(74) *Attorney, Agent, or Firm* — Patent Portfolio Builders, PLLC

(57) ABSTRACT

Systems and methods for determining configurable timing relationships and operational parameters are provided. In some embodiments, a method of operation of a wireless device in a wireless system includes determining round-trip propagation delay information between the wireless device and a network node. This round-trip propagation delay information may be a round-trip propagation delay a quantized round-trip propagation delay, or any other value indicative of the round-trip propagation delay. The in method also includes determining a Hybrid Automatic Retransmission Request (HARQ) operational parameter based on the round-trip propagation delay information between the wireless device and the network node. In this way, HARQ is extended to work for deployments with large round-trip propagation delays, such as satellite systems. This may increase the throughput and reliability of data transmission.

25 Claims, 11 Drawing Sheets

(51) Int. Cl.
*H04B 7/195* (2006.01)
*H04L 5/00* (2006.01)
*H04W 72/08* (2009.01)

(52) U.S. Cl.
CPC .......... *H04L 1/1822* (2013.01); *H04L 5/0055* (2013.01); *H04W 72/085* (2013.01)

(56) References Cited

U.S. PATENT DOCUMENTS

| | | | |
|---|---|---|---|
| 2016/0056947 A1* | 2/2016 | Tiirola | H04B 7/0456 370/280 |
| 2016/0174246 A1* | 6/2016 | Uchino | H04L 1/1887 370/326 |
| 2016/0219580 A1 | 7/2016 | Feng et al. | |
| 2018/0159668 A1* | 6/2018 | Phuyal | H04L 1/1896 |

OTHER PUBLICATIONS

International Search Report and Written Opinion for International Patent Application No. PCT/IB2017/055857, dated Jan. 31, 2018, 15 pages.

Written Opinion for International Patent Application No. PCT/IB2017/055857, dated Sep. 3, 2018, 7 pages.

International Preliminary Report on Patentability for International Patent Application No. PCT/IB2017/055857, dated Dec. 17, 2018, 25 pages.

* cited by examiner

CONFIGURABLE TIMING RELATIONSHIP AND HARQ OPERATIONAL PARAMETERS

RELATED APPLICATIONS

This application is a 35 U.S.C. § 371 national phase filing of International Application No. PCT/IB2017/055857, filed Sep. 26, 2017, which claims the benefit of provisional patent application Ser. No. 62/399,925, filed Sep. 26, 2016, the disclosures of which are hereby incorporated herein by reference in their entireties.

TECHNICAL FIELD

The present disclosure relates to the operation of Hybrid Automatic Retransmission Request (HARQ).

BACKGROUND

In Long Term Evolution (LTE) downlink (DL), User Equipment (UE) feeds back Hybrid Automatic Retransmission Request (HARQ) Acknowledgement (ACK)/Negative Acknowledgement (NAK) in subframe (SF) n+4 for a transmission received in SF n. In LTE uplink (UL), enhanced or evolved NodeB (eNB) feeds back ACK/NAK in SF n+4 for a transmission received in SF n. Thus, for both DL and UL, HARQ ACK/NAK needs to be generated four subframes later. This fixed timing relationship works as long as the round-trip propagation delay plus receiver processing time is within four milliseconds (ms). In LTE, HARQ is based on a stop-and-wait protocol, where the transmitter stops and waits for ACK/NAK after transmitting a transport block. To ensure that the UE throughput is not reduced due to the stop-and-wait protocol, LTE defines eight parallel stop-and-wait HARQ processes to allow continuous data transmission to or from a UE, even when each process allows the ACK/NAK to be generated four ms after the reception of the data transmission.

SUMMARY

Systems and methods for determining configurable timing relationships and operational parameters are provided. In some embodiments, a method of operation of a wireless device in a wireless system includes determining round-trip propagation delay information between the wireless device and a network node. This round-trip propagation delay information may be a round-trip propagation delay, a quantized round-trip propagation delay, or any other value indicative of the round-trip propagation delay. The method also includes determining a Hybrid Automatic Retransmission Request (HARQ) operational parameter based on the round-trip propagation delay information between the wireless device and the network node. In this way, HARQ is extended to work for deployments with large round-trip propagation delays, such as satellite systems. This may increase the throughput and reliability of data transmission.

In some embodiments, the HARQ operational parameter is a HARQ timing relationship and the method also includes determining a number of parallel stop-and-wait HARQ processes based on the HARQ timing relationship.

In some embodiments, determining the round-trip propagation delay information includes receiving a signal from the network node including system information including the round-trip propagation delay information. In some embodiments, receiving the signal from the network node includes receiving a System Information Block (SIB) from the network node including the round-trip propagation delay information.

In some embodiments, determining the HARQ timing relationship based on the round-trip propagation delay information includes receiving a signal including the HARQ timing relationship. In some embodiments, receiving the signal includes receiving a SIB from the network node including the HARQ timing relationship.

In some embodiments, determining the number of parallel stop-and-wait HARQ processes based on the HARQ timing relationship includes receiving a signal including the number of parallel stop-and-wait HARQ processes. In some embodiments, receiving the signal includes receiving a SIB from the network node including the number of parallel stop-and-wait HARQ processes.

In some embodiments, determining the number of parallel stop-and-wait HARQ processes based on the HARQ timing relationship includes determining the number of parallel stop-and-wait HARQ processes implicitly from the HARQ timing relationship and/or the round-trip propagation delay information.

In some embodiments, a wireless device includes at least one transceiver and circuitry. The circuitry is operable to determine round-trip propagation delay information between the wireless device and a network node and determine a HARQ operational parameter based on the round-trip propagation delay information.

In some embodiments, a method of operation of a network node in a wireless system includes determining round-trip propagation delay information between a wireless device and the network node and determining a HARQ operational parameter based on the round-trip propagation delay information.

In some embodiments, the HARQ operational parameter is a HARQ timing relationship, and the method also includes determining a number of parallel stop-and-wait HARQ processes based on the HARQ timing relationship.

In some embodiments, determining the round-trip propagation delay information includes transmitting a signal to the wireless device including system information including the round-trip propagation delay information. In some embodiments, transmitting the signal includes transmitting a SIB to the wireless device including the round-trip propagation delay information between the wireless device and the network node.

In some embodiments, determining the HARQ timing relationship based on the round-trip propagation delay information includes transmitting a signal to the wireless device including the HARQ timing relationship. In some embodiments, transmitting the signal including system information includes transmitting a SIB to the wireless device including the HARQ timing relationship.

In some embodiments, determining the number of parallel stop-and-wait HARQ processes based on the HARQ timing relationship includes transmitting a signal to the wireless device including the number of parallel stop-and-wait HARQ processes. In some embodiments, transmitting the signal including system information includes transmitting a SIB to the wireless device including the number of parallel stop-and-wait HARQ processes.

In some embodiments, a network node includes at least one processor and memory. The memory includes instructions executable by the at least one processor whereby the network node is operable to determine round-trip propagation delay information between a wireless device and the network node and determine a HARQ timing relationship based on the round-trip propagation delay information.

In some embodiments, the network node is a radio access node. In some embodiments, the network node is a radio access node that is in the sky. In some embodiments, the network node is a satellite. In some embodiments, the network node is a ground earth station that is connected to the wireless device via a satellite.

In some embodiments, the round-trip propagation delay between the wireless device and the network node is greater than four milliseconds.

For satellite communications, round-trip propagation delay is much larger than four milliseconds (ms), and thus the Long Term Evolution (LTE) HARQ timing relationship needs to be adjusted in order to support satellite communications. Furthermore, to ensure that continuous data transmission to or from a User Equipment (UE) can be supported, a number of parallel stop-and-wait HARQ processes needs to be adjusted according to the round-trip propagation delay and HARQ timing relationship. In some embodiments, the HARQ timing relationship is configurable in the network through system information signaling. System information in LTE is signaled by using SIBs. Furthermore, in some embodiments, the number of parallel stop-and-wait HARQ processes is adjusted according to the HARQ timing relationship implicitly. In this case, the UE determines the number of parallel stop-and-wait HARQ processes through the HARQ timing relationship, which is signaled in a SIB. Alternatively, the number of parallel stop-and-wait HARQ processes is signaled in a SIB. In this way, LTE is extended to work for deployments with large round-trip propagation delays, such as satellite systems.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Figure 1:
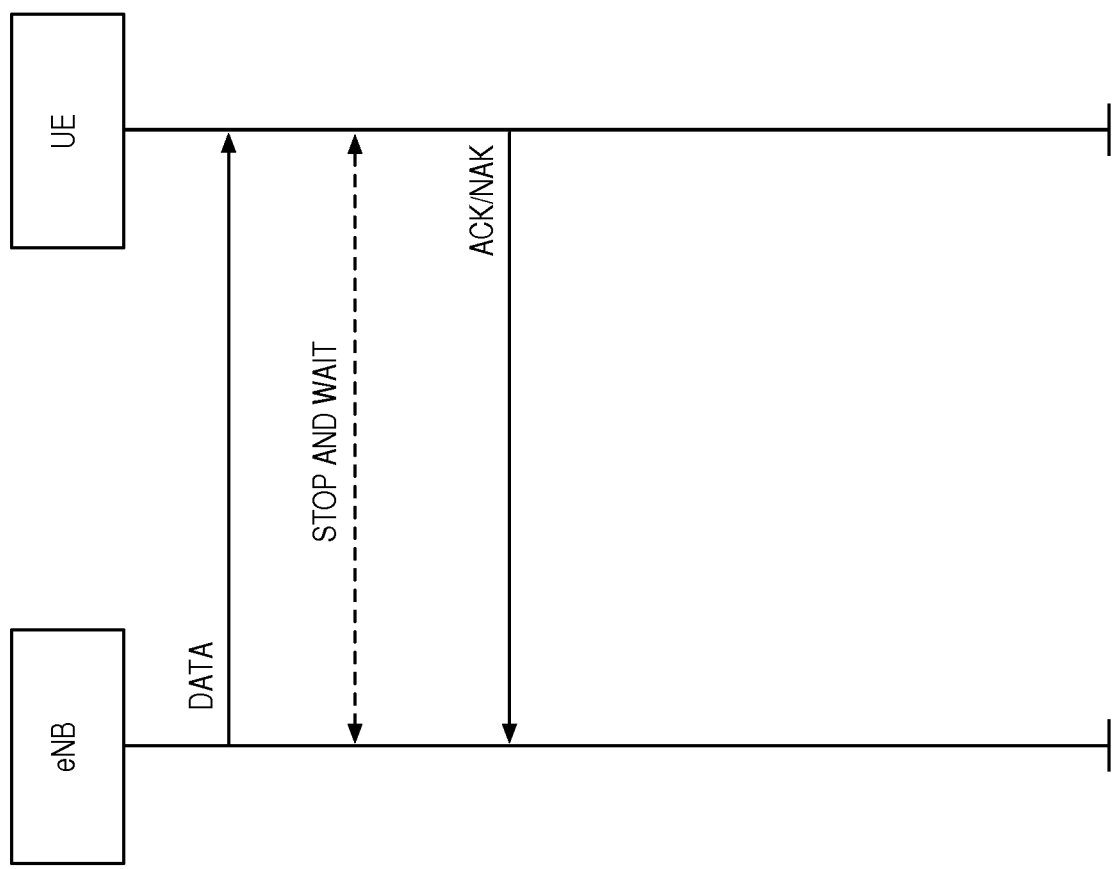
FIG. 1 shows an example of the stop-and-wait protocol.

In LTE downlink (DL), the UE feeds back Hybrid Automatic Retransmission Request (HARQ) Acknowledgement (ACK)/Negative Acknowledgement (NAK) in subframe (SF) n+4 for a transmission received in SF n. In LTE uplink (UL), the eNB feeds back ACK/NAK in SF n+4 for a transmission received in SF n. Thus, for both DL and UL, HARQ ACK/NAK needs to be generated 4 subframes later. This fixed timing relationship works as long as the round-trip propagation delay plus receiver processing time is within four milliseconds (ms). In LTE, HARQ is based on the stop-and-wait protocol, with which the transmitter stops and waits for ACK/NAK after transmitting a transport block. An example is shown in FIG. 1. As illustrated, the eNB sends a data packet to the UE and has to wait for the acknowledgement from the UE before the eNB knows whether the packet has been received correctly by the UE. While waiting, the eNB stops transmitting additional packets to the UE. One drawback with the stop-and-wait protocol is that the throughput is reduced due to the waiting period. This drawback is addressed in LTE by using parallel stopand-wait HARQ processes. This allows the eNB to continuously transmit packets to the UE.

Figure 2:
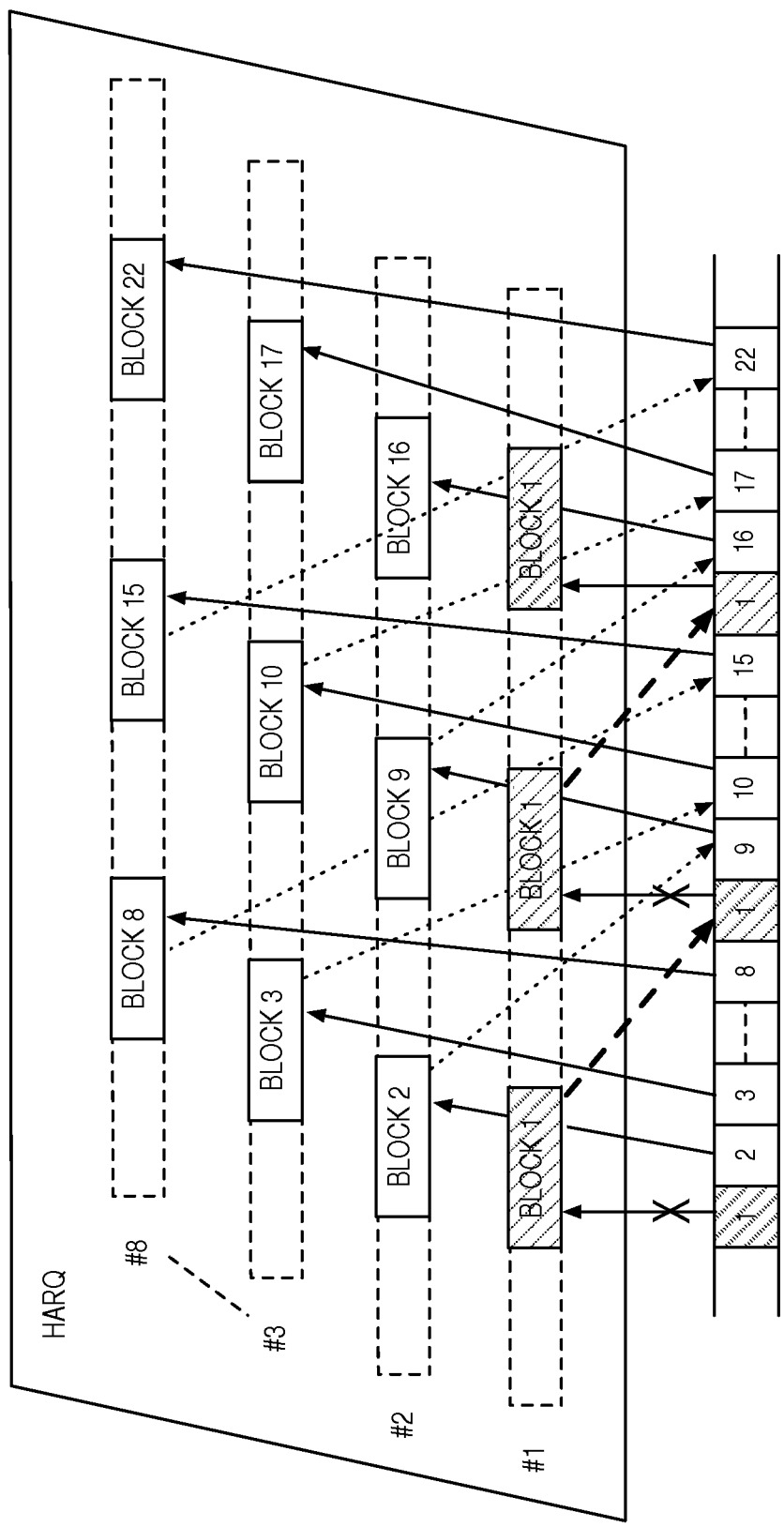
FIG. 2 shows an example of using eight parallel stop-and-wait Hybrid Automatic Retransmission Request (HARQ) processes.

FIG. 2 shows an example of using eight parallel stop-and-wait Hybrid HARQ processes. In this example, the first data block is not correctly received. This is indicated in FIG. 2 with an X covering the transmission. The value is stored as Block 1 in HARQ process #1. The system proceeds to transmit additional data as indicated in Blocks 2 through 8. Since the data in Block 1 is the only one that was not correctly decoded, it is retransmitted. As shown in FIG. 2, this transmission is also not correctly decoded. This process can continue where the data corresponding to Block 1 may be retransmitted multiple times. In the interim, there are multiple other transmissions that are successful.

As a reminder, if this system were not using multiple parallel stop-and-wait HARQ processes, then no other data than Block 1 would be transmitted since the system would still be waiting on a correct decoding of the data. In some embodiments, the data needs to be stored in the HARQ processes in order to increase the chances of correctly decoding the data after an additional transmission. For instance, when multiple transmissions of the same data signal may be necessary, a redundancy version may be communicated to indicate the start position in the circular buffer to perform soft combining. Some methods of increasing the chances of correctly decoding the data include the use of Incremental Redundancy or Chase Combining.

For satellite communications, round-trip propagation delay is much larger than four ms, and thus the existing LTE HARQ timing relationship does not work for the satellite channels.

The present disclosure relates to embodiments where the round-trip propagation delay is longer than usual, e.g., longer than four ms, such as for an In-the-Sky (ITS) radio access node. As used herein, an ITS radio access node is a radio access node implemented in a flying structure such as, e.g., a Low Earth Orbit (LEO) satellite, a drone, a balloon, or the like. It should be noted that while the focus of the description provided herein is on an ITS radio access node, the concepts disclosed herein are equally applicable to any system with increased round-trip propagation delay.

Also, in some situations with a decentralized radio network, the round-trip propagation delay may also be increased. For instance, digital base band signals may be streamed to radio equipment at a distant location, perhaps over Gigabit Ethernet links. In this way, the radio network nodes can all be operated in a central location for a region. This may lead to situations where the round-trip propagation delay is increased. Additionally, the embodiments disclosed herein allow for additional configurability of the wireless devices. For instance, if the round-trip propagation delay changes over time, then these procedures can be reevaluated in order to adjust to these changing environments. In some cases, the processing time at the wireless device requires changes to the HARQ operational parameter. For instance, in low power devices the processing power may be limited, causing the overall round-trip propagation delay to be increased.

Additionally, there may be instances where the round-trip propagation delay and processing time is much less than the four ms. In these instances, a HARQ operational parameter may be configured differently. For instance, a HARQ timing relationship such as a number of parallel stop-and-wait HARQ processes may be decreased since fewer such processes may be needed to maintain continuous transmissions.

Figure 3:
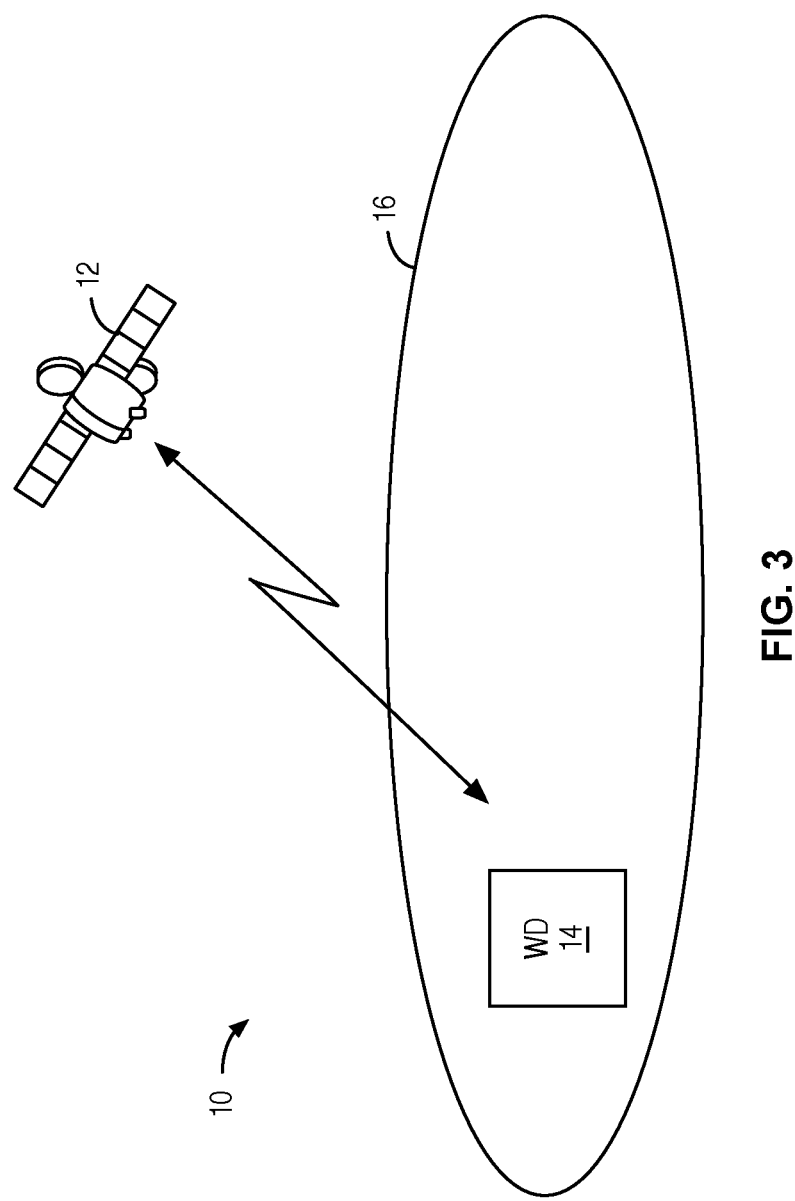
FIG. 3 illustrates one example of a wireless system.

In this regard, FIG. 3 illustrates one example of a wireless system 10 (e.g., a cellular communications system) in which embodiments of the present disclosure may be implemented. The wireless system 10 includes a radio access node 12, which in this example is a satellite (e.g., a LEO satellite). However, the radio access node 12 is not limited to a satellite (e.g., the radio access node 12 can be another device such as a drone, balloon, or the like). The radio access node 12 provides wireless access to wireless devices, such as a wireless device 14, within a coverage area 16 (e.g., cell) of the radio access node 12. In this embodiment, the distance between the radio access node 12 and the wireless device 14 causes an increased round-trip propagation delay. As used herein, an increased round-trip propagation delay is a delay that would not satisfy the fixed timing relationship that requires the round-trip propagation delay plus receiver processing time to be less than four ms. In some embodiments, the wireless device 14 is a LTE UE. Note that the term "UE" is used herein in its broad sense to mean any wireless device. As such, the terms "wireless device" and "UE" are used interchangeably herein.

In the following, embodiments are described using satellite communication as a non-limiting example. These embodiments, however, apply to other deployments such as those with fast moving infrastructure or UEs. For example, the orbital velocity of a typical LEO satellite needed to maintain a stable orbit is about 7.8 km/s. For such an LEO satellite system operating at e.g. 5 GHz carrier frequency, signals from/to a UE in the coverage area of the satellite may experience Doppler shift as large as 130 kHz. Moreover, the Doppler shift varies as the satellite moves, and UEs in different locations experience different Doppler shifts and varying rates.

Systems and methods for determining configurable timing relationships and operational parameters are provided. In some embodiments, a method of operation of a wireless device in a wireless system includes determining round-trip propagation delay information between the wireless device and a network node. The method also includes determining a HARQ operational parameter based on the round-trip propagation delay information between the wireless device and the network node. In this way, HARQ is extended to work for deployments with large round-trip propagation delays, such as satellite systems. This may increase the throughput and reliability of data transmission.

Figure 4:
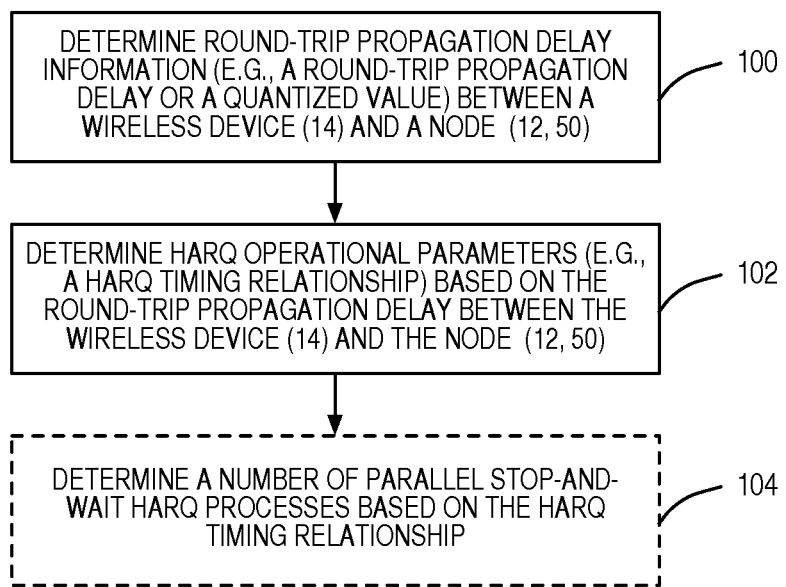
FIG. 4 illustrates a HARQ configuration procedure according to some embodiments of the present disclosure.

FIG. 4 illustrates a HARQ configuration procedure according to some embodiments of the present disclosure. In some embodiments, these steps are performed by the wireless device 14, the radio access node 12, and/or a combination of both. First, a round-trip propagation delay information between the wireless device 14 and the radio access node 12 is determined (step 100). This may be accomplished by calculating the delay directly or indirectly, or by signaling the delay from one node to the other. In some embodiments, the round-trip propagation delay information may be the round-trip propagation delay, a quantized round-trip propagation delay, or any other value indicative of the round-trip propagation delay.

Next, HARQ operational parameters (e.g., a HARQ timing relationship and/or a number of parallel stop-and-wait HARQ processes) are determined based on the round-trip propagation delay information between the wireless device 14 and the radio access node 12 (step 102). In some embodiments, a number of parallel stop-and-wait HARQ processes is determined based on a HARQ timing relationship which may be based on the round-trip propagation delay between the wireless device 14 and the radio access node 12 (step 104).

Figure 6:
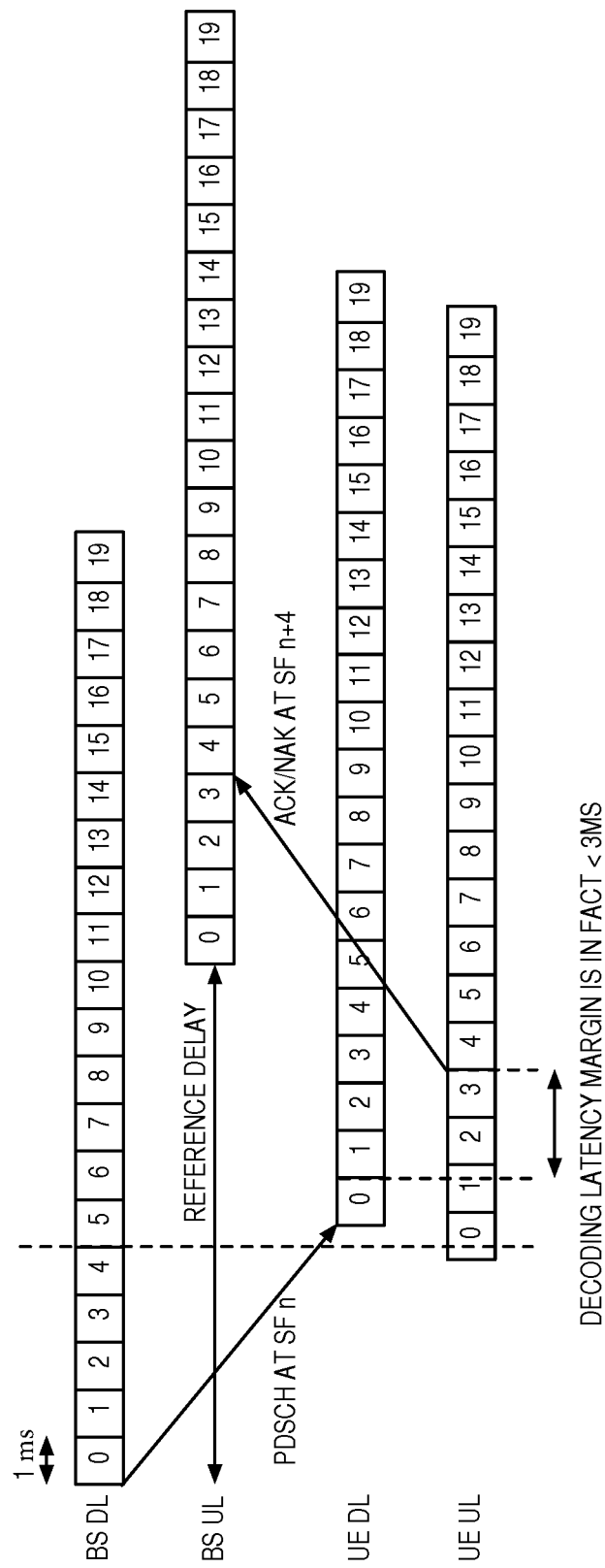
FIG. 6 illustrates a timing relationship for Downlink (DL) HARQ operation according to some embodiments of the present disclosure.
Figure 7:
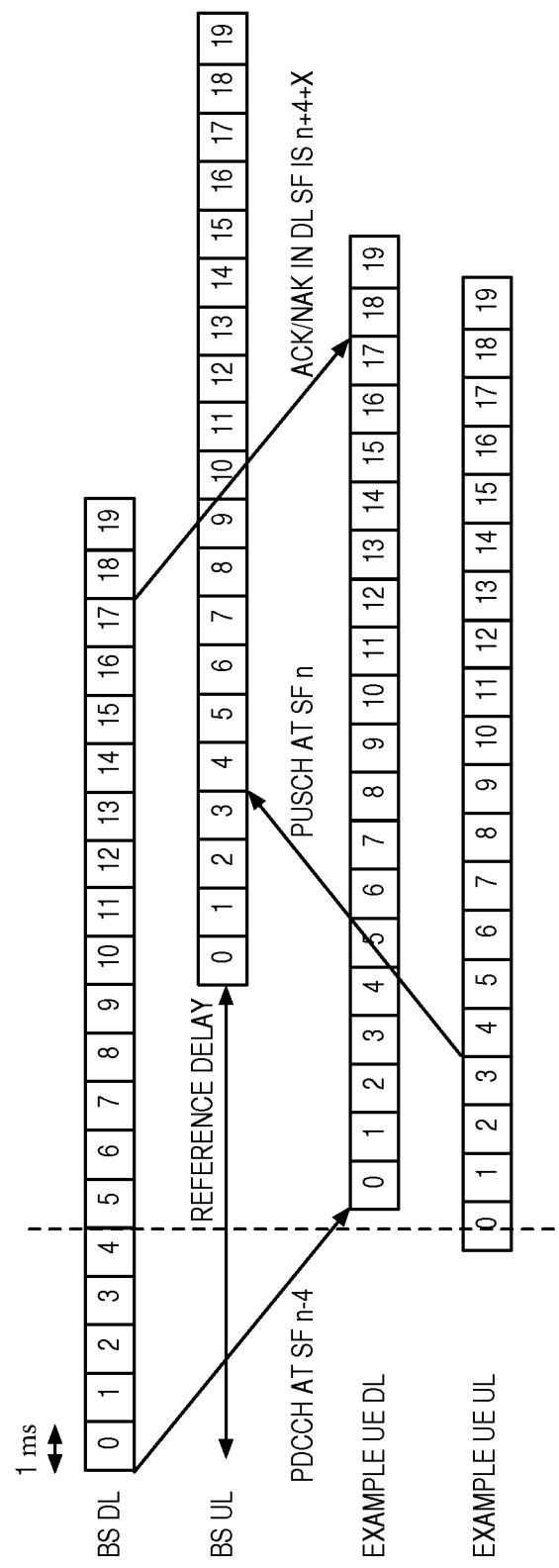
FIG. 7 illustrates a timing relationship for Uplink (UL) HARQ operation according to some embodiments of the present disclosure.
Figure 8:
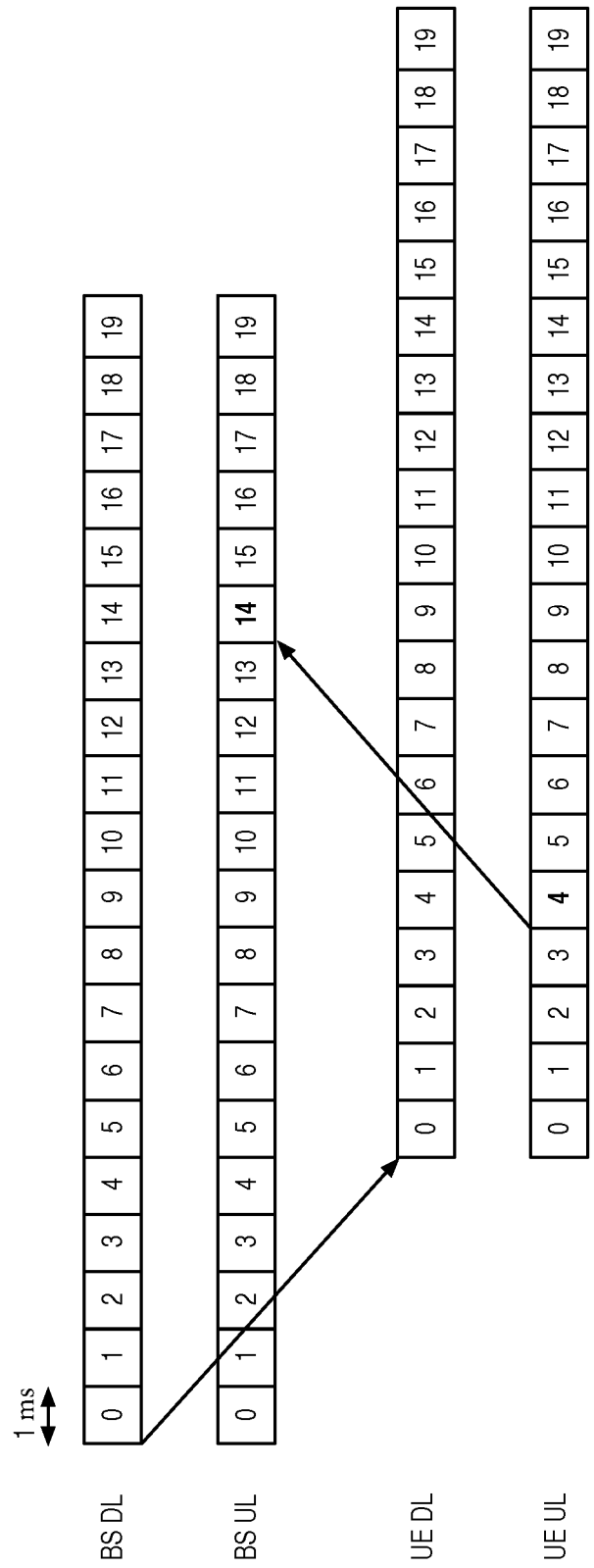
FIG. 8 illustrates another timing relationship for HARQ operation according to some embodiments of the present disclosure.

The radio access node 12 and/or the wireless device 14 may then perform a HARQ operation using the determined HARQ operational parameter. Some examples of this are shown in FIGS. 6 through 8 and the accompanying descriptions.

Some embodiments include signaling the round-trip propagation delay information, e.g., in one of the system information blocks. A system information block is mapped to the logical Broadcast Control Channel (BCCH), and carried by the Physical Downlink Shared Channel (PDSCH). The round-trip propagation delay information may be a reference round-trip propagation delay with respect to UEs in the center of the cell (or any other reference point in the cell). The round-trip propagation delay information may be a quantized reference round-trip propagation delay.

Figure 5:
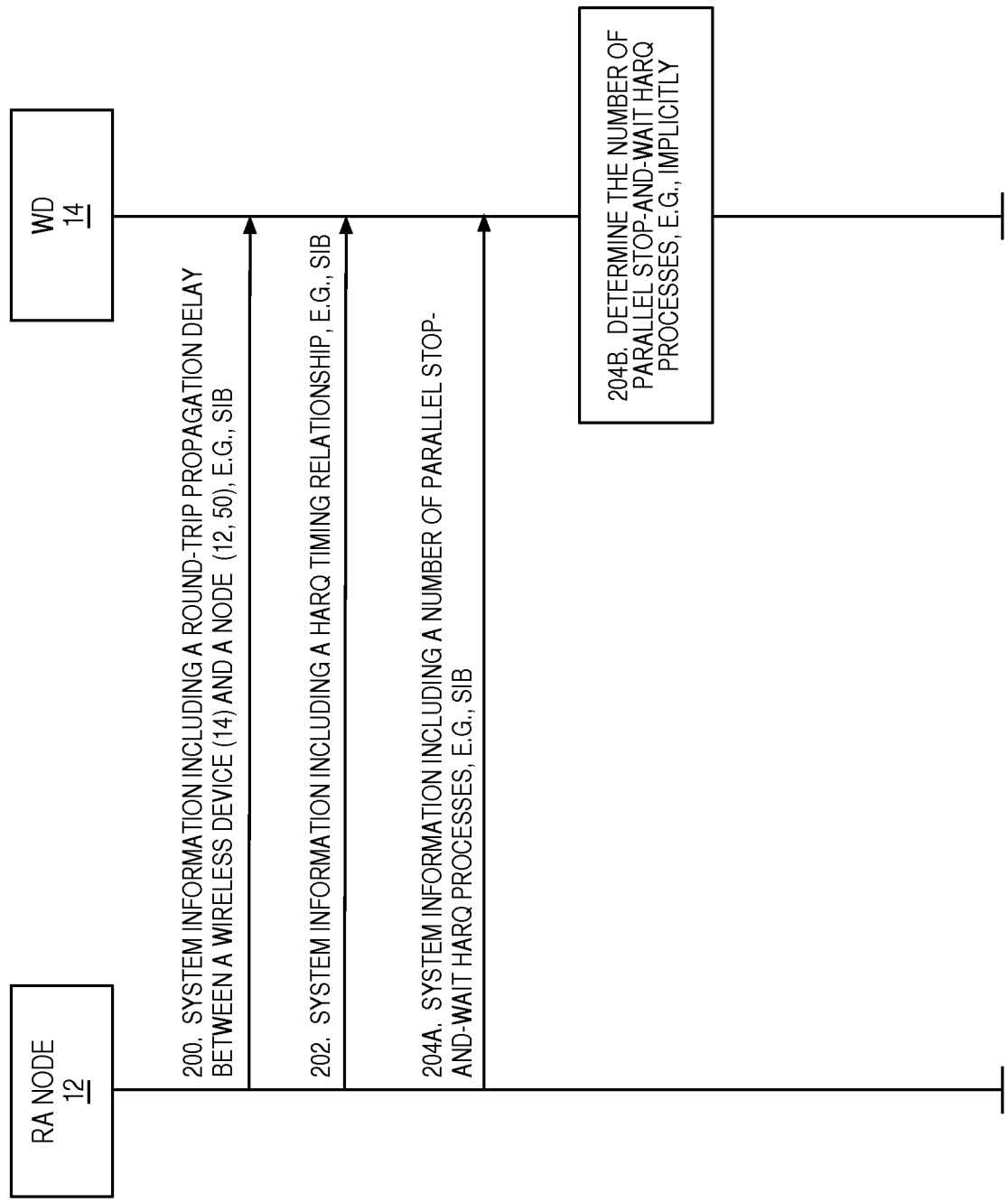
FIG. 5 illustrates a more detailed HARQ configuration procedure according to some embodiments of the present disclosure.

FIG. 5 illustrates a more detailed HARQ configuration procedure according to some embodiments of the present disclosure. First, system information including a round-trip propagation delay between the wireless device 14 and the radio access node 12 is transmitted by the radio access node 12 and received by the wireless device 14, e.g., via a SIB (step 200). Next, system information including a HARQ timing relationship based on the round-trip propagation delay between the wireless device 14 and the network node 12 is transmitted by the radio access node 12 and received by the wireless device 14, e.g., via a SIB (step 202). Then, a number of parallel stop-and-wait HARQ processes is determined based on the HARQ timing relationship. In some embodiments, this is accomplished by the radio access node 12 transmitting and the wireless device 14 receiving system information including the number of parallel stop-and-wait HARQ processes, e.g., via a SIB (step 204A). In other embodiments, this is accomplished by the wireless device 14 determining the number of parallel stop-and-wait HARQ processes, e.g., implicitly (step 204B).

With the round-trip propagation delay information, the UE 14 configures the HARQ timing relationship. The UE 14 may further determine the number of parallel stop-and-wait HARQ processes based on the round-trip propagation delay information. Alternatively, the number of parallel stop-and-wait HARQ processes may also be signed in one of the system information blocks.

In the below description, an example based on ten ms reference round-trip propagation delay is illustrated. The reference one-way propagation delay is therefore five ms. However, this value is merely an example and the current disclosure is not limited thereto.

The timing relationship for DL HARQ operation is illustrated in FIG. 6. According to this example, it is the relationship between DL and UL subframes at the eNB 12 that is adjusted according to the reference round-trip propagation delay (shown as "REFERENCE DELAY" in FIG. 6). As shown, the eNB 12 offsets the UL subframes by ten ms relative to the DL subframes. Thus, the uplink subframe 0 is ten ms later than the DL subframe 0. Since the eNB 12 knows the reference round-trip propagation delay, it knows the relationship between DL and UL subframes at the eNB 12. The relationship between DL and UL subframes at the UE 14 is only determined by the timing advance as in the current LTE specifications.

The timing relationship for UL HARQ operation is illustrated in FIG. 7. In this example, the eNB 12 schedules the UE's Physical Uplink Shared Channel (PUSCH) transmission to take place in subframe n (n=4 in the example). The eNB 12 receives PUSCH at subframe n, which is concurrent with DL subframe n+X, where X is the reference round-trip propagation delay. As discussed above, the round-trip propagation delay information may be a quantized reference round-trip propagation delay. That is, while the actual delay value may be any real value of time (e.g., 9.7 ms), in some embodiments this may be rounded to an integer number of ms (not necessarily the closest) in order to treat the reference delay as a number of subframes to be delayed (X=10 in the example). In some embodiments, the quantized reference round-trip propagation delay may not be on the level of a number of subframes. In some embodiments, the quantized reference round-trip propagation delay may be a number of slots or may even be on the order of a number of Orthogonal Frequency-Division Multiplexing (OFDM) symbols. After PUSCH reception, the HARQ ACK/NAK is transmitted 4 subframes (i.e. 4 ms) later in subframe n+X+4. The UE 14 thus receives the HARQ ACK/NAK in DL subframe n+X+4. According to some embodiments, the UE 14 determines the timing relationship between its uplink PUSCH transmission and the associated ACK/NAK based on the reference round-trip propagation delay X. Furthermore, if a retransmission is needed, the UE 14 retransmits the packet 4 subframes after the HARQ ACK/NAK. Thus, the retransmission will take place in subframe n+X+8. According to some embodiments, the UE 14 determines the timing relationship between its uplink PUSCH transmission and the associated retransmissions based on the reference round-trip propagation delay X.

To allow continuous transmission to and from a UE 14 even when the round-trip propagation delay is large, the number of parallel stop-and-wait HARQ processes can be adjusted accordingly. For example, if the processing time at the eNB 12 and UE 14 is 4 ms each, the time between two retransmissions is X+4+4 ms. In this case, using X+8 parallel stop-and-wait HARQ processes would allow continuous transmission to and from a UE 14. Thus, knowing the value of X, the UE 14 can figure out the number of parallel stop-and-wait HARQ processes. Here, it is assumed that the processing time budget at the eNB 12 and UE 14 is a priori information that the UE 14 already knows. Alternatively, the number of parallel stop-and-wait HARQ processes may be signaled in one of the system information blocks.

FIG. 8 illustrates another timing relationship for HARQ operation according to some embodiments of the present disclosure. In some embodiments, there are different ways to determine the timing relationship between DL and UL SFs based on the round-trip propagation delay. FIGS. 6 and 7 describe one example. FIG. 8 illustrates another example; in this case, the UL timing is not shifted at the BS relative to its DL timing. Nominally in the terrestrial case, the BS expects the ACK/NAK to be received in UL subframe 4 for the DL data transmission in subframe 0. Due to large round-trip propagation delay however, the BS instead expects the ACK/NAK to be received in UL subframe 4+X for the DL data transmission in subframe 0, where X is the round-trip propagation delay. Thus, in this example, it is the timing relationship in terms of SF numbers, between DL transmission and UL ACK/NAK, that is determined based on the round-trip propagation delay.

Figure 9:
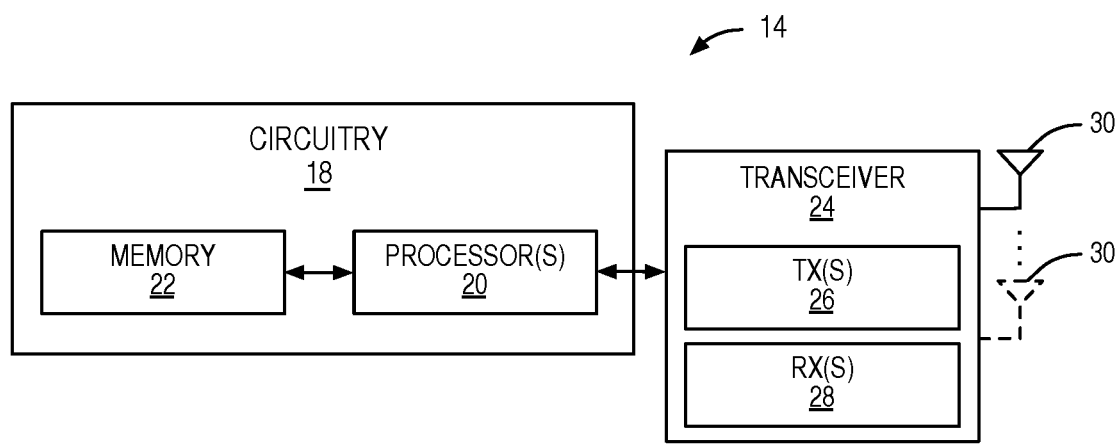
FIGS. 9 and 10 illustrate example embodiments of a wireless device according to some embodiments of the present disclosure.

FIG. 9 is a schematic block diagram of the wireless device 14 (e.g., a UE 14) according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
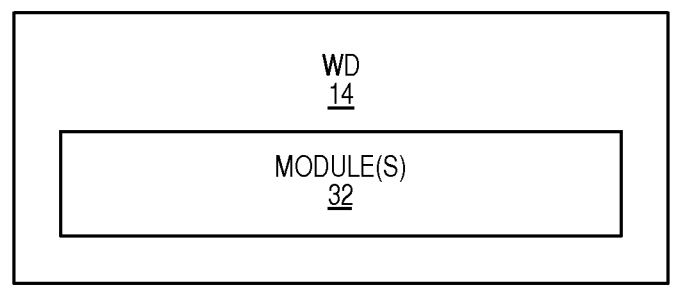

FIG. 10 is a schematic block diagram of the wireless device 14 according to some other embodiments of the present disclosure. The wireless device 14 includes one or more modules 32, each of which is implemented in software. The module(s) 32 provide the functionality of the wireless device 14 (e.g., UE 14) described herein.

Figure 11:
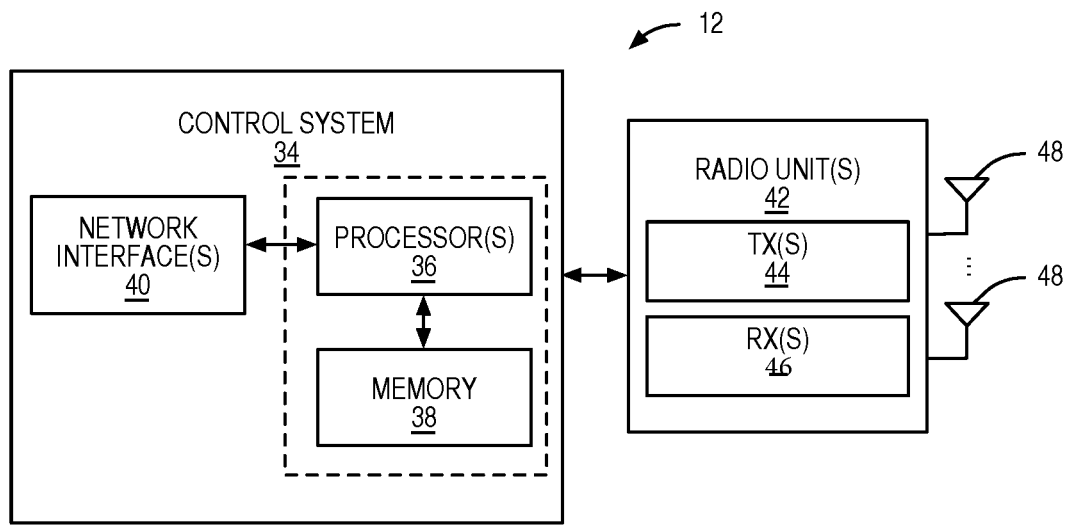
FIGS. 11 through 13 illustrate example embodiments of a radio network node according to some embodiments of the present disclosure.

FIG. 11 is a schematic block diagram of the radio access node 12 according to some embodiments of the present disclosure. Other types of network nodes may have similar architectures (particularly with respect to including processor(s), memory, and a network interface). As illustrated, the radio access node 12 includes a control system 34 that includes circuitry comprising one or more processors 36 (e.g., CPUs, ASICs, FPGAs, and/or the like) and memory 38. The control system 34 also includes a network interface 40. The radio access node 12 also includes one or more radio units 42 that each include one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

Figure 12:
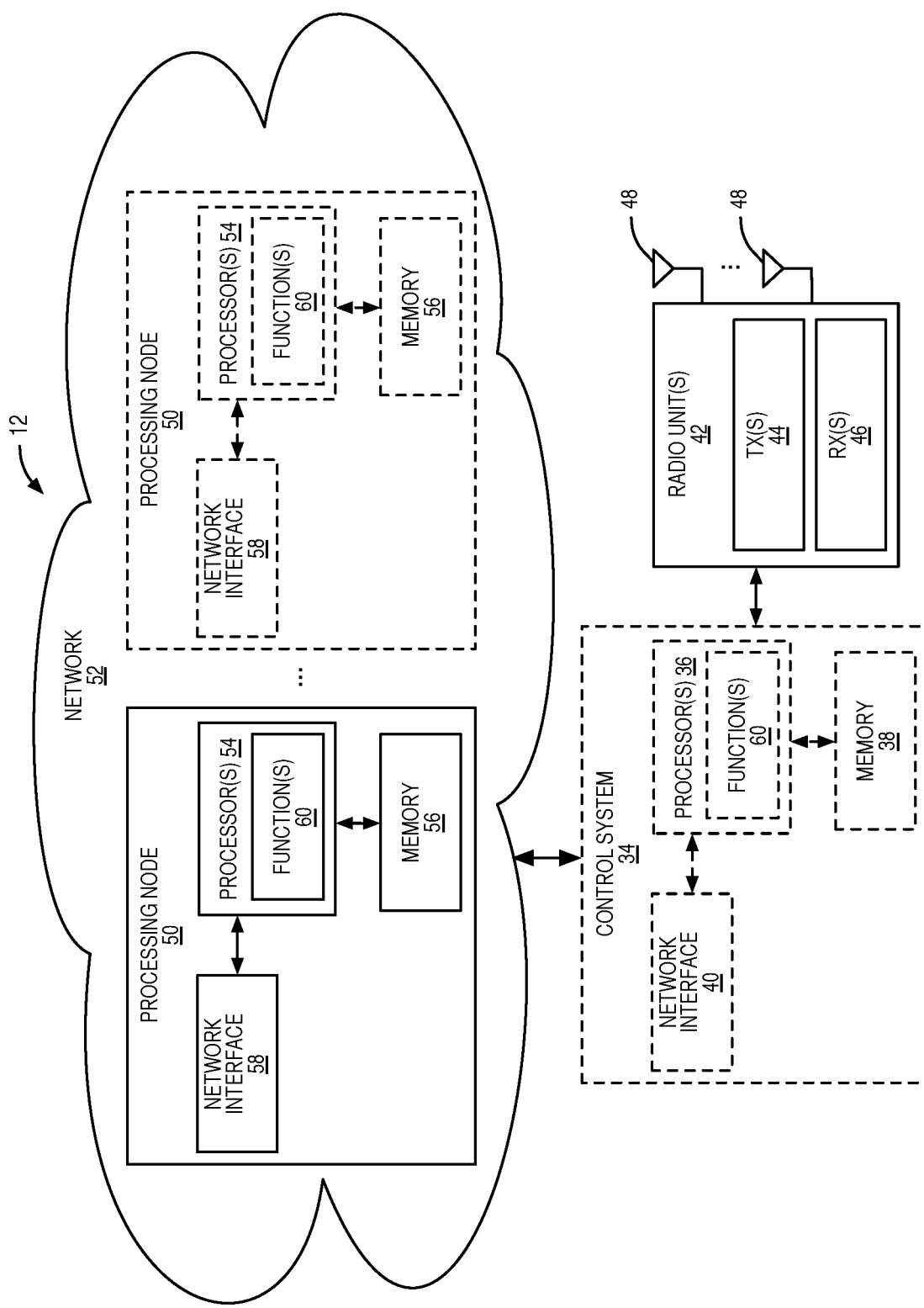

FIG. 12 is a schematic block diagram that illustrates a virtualized embodiment of the radio access node 12 according to some embodiments of the present disclosure. Other types of network nodes may have similar architectures (particularly with respect to including processor(s), memory, and a network interface).

As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 11. The radio access node 12 also includes the one or more radio units 42 that each include the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 12 described herein are implemented at the one or more processing nodes 50 or distributed across the control system 34 (if present) and the one or more processing nodes 50 in any desired manner. In some particular embodiments, some or all of the functions 60 of the radio access node 12 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 50 via an appropriate network interface(s).

In some embodiments, a computer program including instructions which, when executed by at least one processor, causes the at least one processor to carry out the functionality of the radio access node 12 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
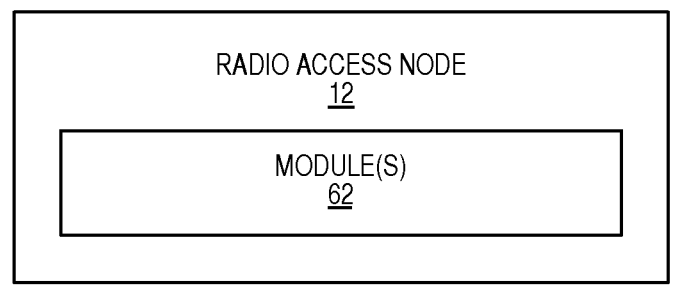

FIG. 13 is a schematic block diagram of the radio access node 12 according to some other embodiments of the present disclosure. The radio access node 12 includes one or more modules 62, each of which is implemented in software. The module(s) 62 provide the functionality of the radio access node 12 described herein.

The following acronyms are used throughout this disclosure.

| | |
|---|---|
| 3GPP | Third Generation Partnership Project |
| 5G | Fifth Generation |
| ACK | Acknowledgement |
| ASIC | Application Specific Integrated Circuit |
| BCCH | Broadcast Control Channel |
| CN | Core Network |
| CPU | Central Processing Unit |
| DL | Downlink |
| eNB | Enhanced or Evolved Node B |
| FPGA | Field Programmable Gate Array |
| HARQ | Hybrid Automatic Retransmission Request |
| ITS | In-the-Sky |
| LEO | Low Earth Orbit |
| LTE | Long Term Evolution |
| MME | Mobility Management Entity |
| ms | Millisecond |
| MTC | Machine Type Communication |
| NAK | Negative Acknowledgement |
| OFDM | Orthogonal Frequency-Division Multiplexing |
| P-GW | Packet Data Network Gateway |
| PDN | Packet Data Network |
| PDSCH | Physical Downlink Shared Channel |
| PUSCH | Physical Uplink Shared Channel |
| SCEF | Service Capability Exposure Function |
| SF | Subframe |
| SIB | System Information Block |
| UE | User Equipment |
| UL | Uplink |

Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a wireless system, the method comprising:

receiving a System Information Block (SIB), from a network node, comprising round-trip propagation delay information between the wireless device and the network node;

determining a Hybrid Automatic Retransmission Request (HARQ) timing relationship based on the round-trip propagation delay information between the wireless device and the network node; and determining a number of parallel stop-and-wait HARQ processes based on the HARQ timing relationship.

2. The method of claim 1, wherein determining the HARQ timing relationship based on the round-trip propagation delay information between the wireless device and the network node comprises receiving a signal comprising the HARQ timing relationship.

3. The method of claim 2, wherein receiving the signal comprising the HARQ timing relationship comprises receiving the SIB, from the network node comprising the HARQ timing relationship.

4. The method of claim 1, wherein determining the number of parallel stop-and-wait HARQ processes based on the HARQ timing relationship comprises receiving a signal comprising the number of parallel stop-and-wait HARQ processes.

5. The method of claim 4, wherein receiving the signal comprising the number of parallel stop-and-wait HARQ processes comprises receiving the SIB from the network node comprising the number of parallel stop-and-wait HARQ processes.

6. The method of claim 1, wherein determining the number of parallel stop-and-wait HARQ processes based on the HARQ timing relationship comprises:
determining the number of parallel stop-and-wait HARQ processes implicitly from the HARQ timing relationship and/or the round-trip propagation delay information between the wireless device and the network node.

7. The method of claim 1, further comprising performing a HARQ operation using the determined HARQ timing relationship.

8. The method of claim 1, wherein the network node is a radio access node.

9. The method of claim 1, wherein the network node is a radio access node that is in the sky.

10. The method of claim 1, wherein the network node is a satellite.

11. The method of claim 1, wherein the network node is a ground earth station that is connected to the wireless device via a satellite.

12. The method of claim 1, wherein the round-trip propagation delay information between the wireless device and the network node is greater than four milliseconds.

13. A wireless device, comprising:
at least one transceiver; and
circuitry operable to:
receive a System Information Block (SIB), from a network node comprising round-trip propagation delay information between the wireless device and the network node;
determine a Hybrid Automatic Retransmission Request (HARQ) timing relationship based on the round-trip propagation delay information between the wireless device and the network node; and
determine a number of parallel stop-and-wait HARQ processes based on the HARQ timing relationship.

14. A method of operation of a network node in a wireless system, the method comprising:
transmitting a System Information Block (SIB), to a wireless device, comprising round-trip propagation delay information between the wireless device and the network node;
determining a Hybrid Automatic Retransmission Request (HARQ) timing relationship based on the round-trip propagation delay information between the wireless device and the network node; and
determining a number of parallel stop-and-wait HARQ processes based on the HARQ timing relationship.

15. The method of claim 14, wherein determining the HARQ timing relationship based on the round-trip propagation delay information between the wireless device and the network node comprises transmitting a signal to the wireless device comprising the HARQ timing relationship.

16. The method of claim 15, wherein transmitting the signal comprising the HARQ timing relationship comprises transmitting the SIB, to the wireless device, comprising the HARQ timing relationship.

17. The method of claim 14, wherein determining the number of parallel stop-and-wait HARQ processes based on the HARQ timing relationship comprises:
transmitting a signal to the wireless device comprising the number of parallel stop-and-wait HARQ processes.

18. The method of claim 17, wherein transmitting the signal comprising the number of parallel stop-and-wait HARQ processes comprises transmitting the SIB, to the wireless device, comprising the number of parallel stop-and-wait HARQ processes.

19. The method of claim 14, further comprising performing a HARQ operation using the determined HARQ timing relationship.

20. The method of claim 14, wherein the network node is a radio access node.

21. The method of claim 14, wherein the network node is a radio access node that is in the sky.

22. The method of claim 14, wherein the network node is a satellite.

23. The method of claim 14, wherein the network node is a ground earth station that is connected to the wireless device via a satellite.

24. The method of claim 14, wherein the round-trip propagation delay information between the wireless device and the network node is greater than four milliseconds.

25. A network node, comprising:
at least one processor; and
memory comprising instructions executable by the at least one processor whereby the network node is operable to:
transmit a System Information Block (SIB), to a wireless device comprising round-trip propagation delay information between the wireless device and the network node;
determine a Hybrid Automatic Retransmission Request (HARQ) timing relationship based on the round-trip propagation delay information between the wireless device and the network node; and
determine a number of parallel stop-and-wait HARQ processes based on the HARQ timing relationship.

* * * * *